United States Patent
Chambers et al.

(10) Patent No.: US 8,346,922 B2
(45) Date of Patent: *Jan. 1, 2013

(54) PEER TO PEER MONITORING FRAMEWORK FOR TRANSACTION TRACKING

(75) Inventors: Graeme Stanley Chambers, Perth (AU); Simon Tevery Huband, Perth (AU); Luke Rowan McKenna, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,696

(22) Filed: Mar. 8, 2012

(65) Prior Publication Data

US 2012/0166640 A1    Jun. 28, 2012

Related U.S. Application Data

(63) Continuation of application No. 12/763,667, filed on Apr. 20, 2010.

(51) Int. Cl.
*G06F 15/173* (2006.01)
(52) U.S. Cl. ........ 709/224; 709/223; 709/225; 709/226; 709/209; 709/203; 709/217
(58) Field of Classification Search .......... 709/223–226, 709/209, 203, 217
See application file for complete search history.

(56) References Cited

U.S. PATENT DOCUMENTS

| | | | |
|---|---|---|---|
| 2008/0301246 A1* | 12/2008 | Gkantsidis et al. | 709/206 |
| 2009/0037211 A1* | 2/2009 | McGill et al. | 705/1 |
| 2009/0083390 A1 | 3/2009 | Abu-Ghazaleh et al. | 709/209 |
| 2010/0100587 A1* | 4/2010 | Teglovic et al. | 709/203 |

OTHER PUBLICATIONS

Sacha, "Exploiting Heterogeneity in Peer-to-Peer Systems Using Gradient Topologies," http://www.cs.vu.nl/~jsacha/pub/phd.pdf, University of Dublin, Jun. 2009, 218 pages.

Sato et al., "Dynamic Search Redirection in Adaptive P2P System," http://www.ny57.org/pub/ciit05s.pdf, Saitama University, Oct. 2005, 6 pages.

Amarasena et al., "Implementing Agent communication I a parallel task execution framework," http://www.cs.mu.oz.au/481/2004_projects/Amarasena_Desai_Bahuguna.pdf, publication date unknown, 22 pages.

(Continued)

*Primary Examiner* — Wing Chan
*Assistant Examiner* — Benjamin M Thieu
(74) *Attorney, Agent, or Firm* — VanLeeuwen & VanLeeuwen; John D. Flynn (57) ABSTRACT

An approach is provided that transmits a load balance request from a first peer node to other peer nodes. Some of the peer nodes have assigned transaction tracking responsibilities. The transmitting is performed in response to identifying that the first peer node is performing at a non-optimal level. The first peer node receives responses from the other peer nodes. A determination is made as to whether to handover one or more of the first peer node's transaction tracking responsibilities. If a second peer node is identified to take some of the first peer node's responsibilities, then a handover message is sent from the first peer node to the second peer node that assigns at least one of the first peer node's assigned transaction responsibilities to the second peer node.

16 Claims, 9 Drawing Sheets

OTHER PUBLICATIONS

Garbacki et al., "Optimizing Peer Relationships in a Super-Peer Network," http://www.cs.vu.nl/~steen/papers/2007a.icdcs.pdf, Proceedings of the 27$^{th}$ International Conference on Distributed Computing Systems, Jun. 2007, pp. 1-25.

Zhuang et al., "Dynamic Layer Management in Super-peer Architectures," http://ieeexplore.ieee.org/xpl/freeabs_all.jsp?arnumber=1327901, Proceedings of the 2004 International Conference on Parallel Processing, IEEE, Aug. 2004, 8 pages.

Zaharia et al., "Adaptive Peer-to-Peer Search," http://www.cs.berkeley.edu/~matei/papers/2004/tr_hybrid.pdf, University of Waterloo Technical Report, Waterloo, Ontario, Nov. 2004, pp. 1-21.

Li et al., "Searching Techniques in Peer-to-Peer Networks," Department of Computer Science and Engineering, Florida Atlantic University, In Handbook of Theoretical and Algorithmic Aspects of Ad Hoc, Sensor, and Peer-to-Peer Networks, 2006, pp. 1-31.

* cited by examiner

PEER TO PEER MONITORING FRAMEWORK FOR TRANSACTION TRACKING

RELATED APPLICATION

This application is a continuation of U.S. application Ser. No. 12/763,667, filed Apr. 20, 2010, titled "Peer to Peer Monitoring Framework for Transaction Tracking," and having the same inventors as the above-referenced application.

BACKGROUND OF THE INVENTION

Network and application monitoring traditionally involves processing large amounts of data into aggregate representations. Traditional systems use tiered client-server architectures for tracking solutions. Client-server architectures suffer from scalability issues which tend to result in a limit of the scale by restricting tracking data.

SUMMARY

An approach is provided that transmits a load balance request from a first peer node to other peer nodes using a computer network, with each of the peer nodes being included in a transaction tracking framework. Some of the peer nodes, including the first peer node, have assigned transaction tracking responsibilities. The transmitting is performed in response to identifying that the first peer node is performing at a non-optimal level. The first peer node receives responses from the other peer nodes. A determination is made as to whether to handover one or more of the first peer node's transaction tracking responsibilities. If a second peer node is identified to take some of the first peer node's responsibilities, then a handover message is sent from the first peer node to the second peer node that assigns at least one of the first peer node's assigned transaction responsibilities to the second peer node. However, if the first peer node decides to inhibit handover of any of the selected one or more transaction tracking responsibilities, then the transaction tracking responsibilities assigned to the first peer node are maintained by the first peer node.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
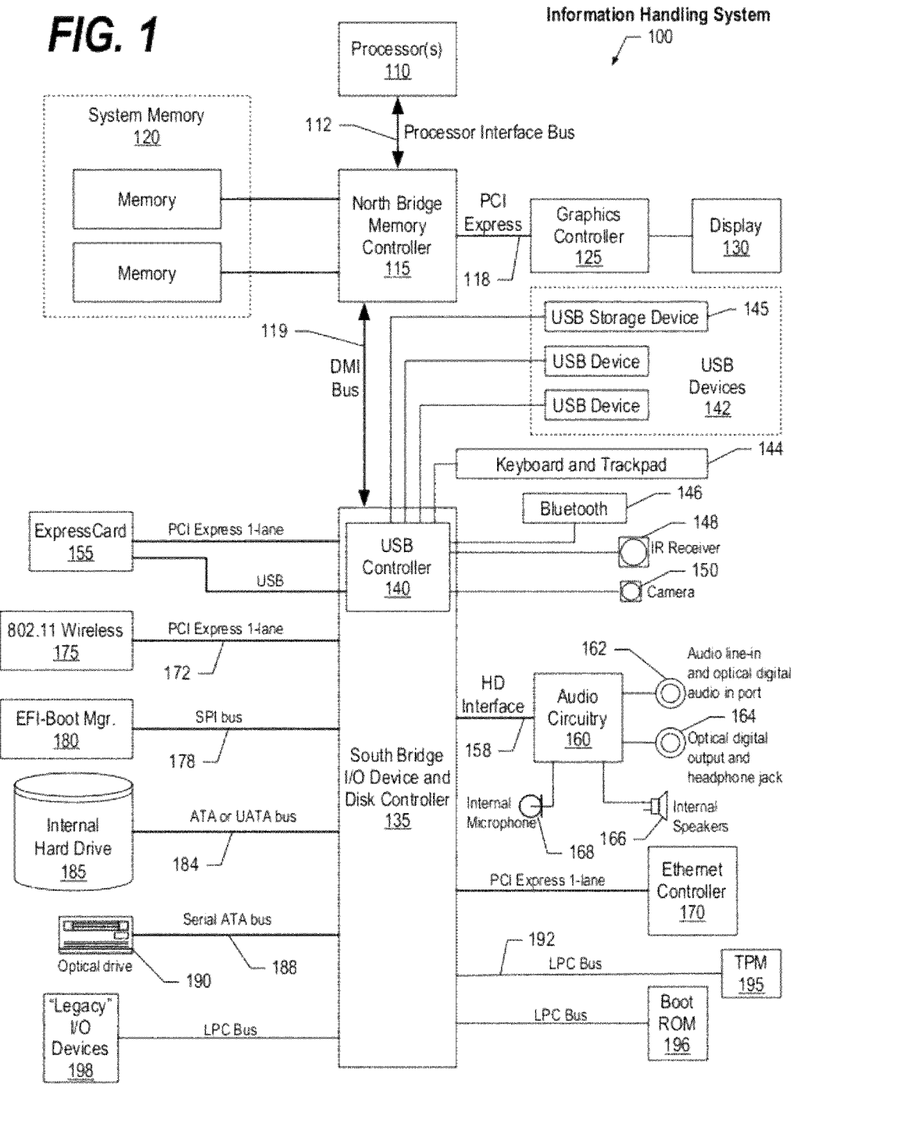
FIG. 1 is a block diagram of a data processing system in which the methods described herein can be implemented.
Figure 2:
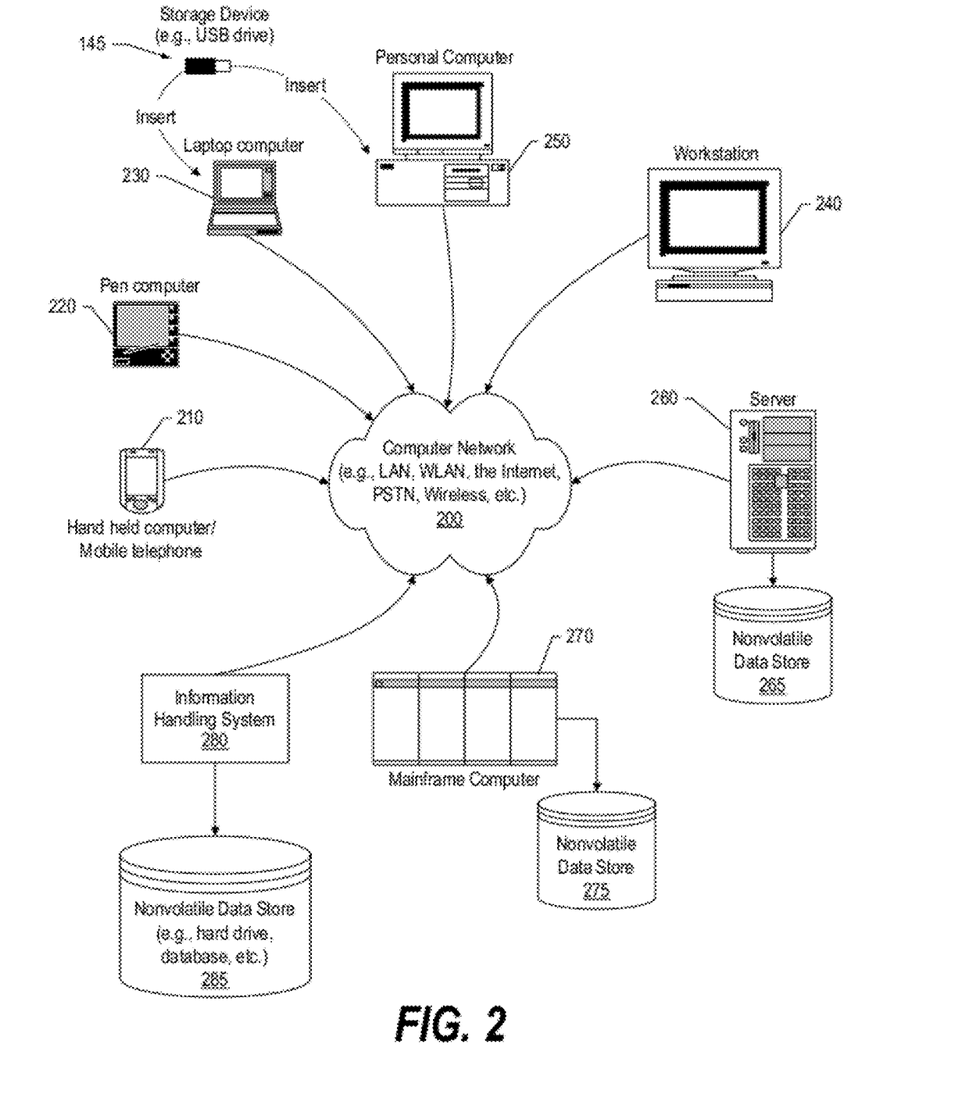
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
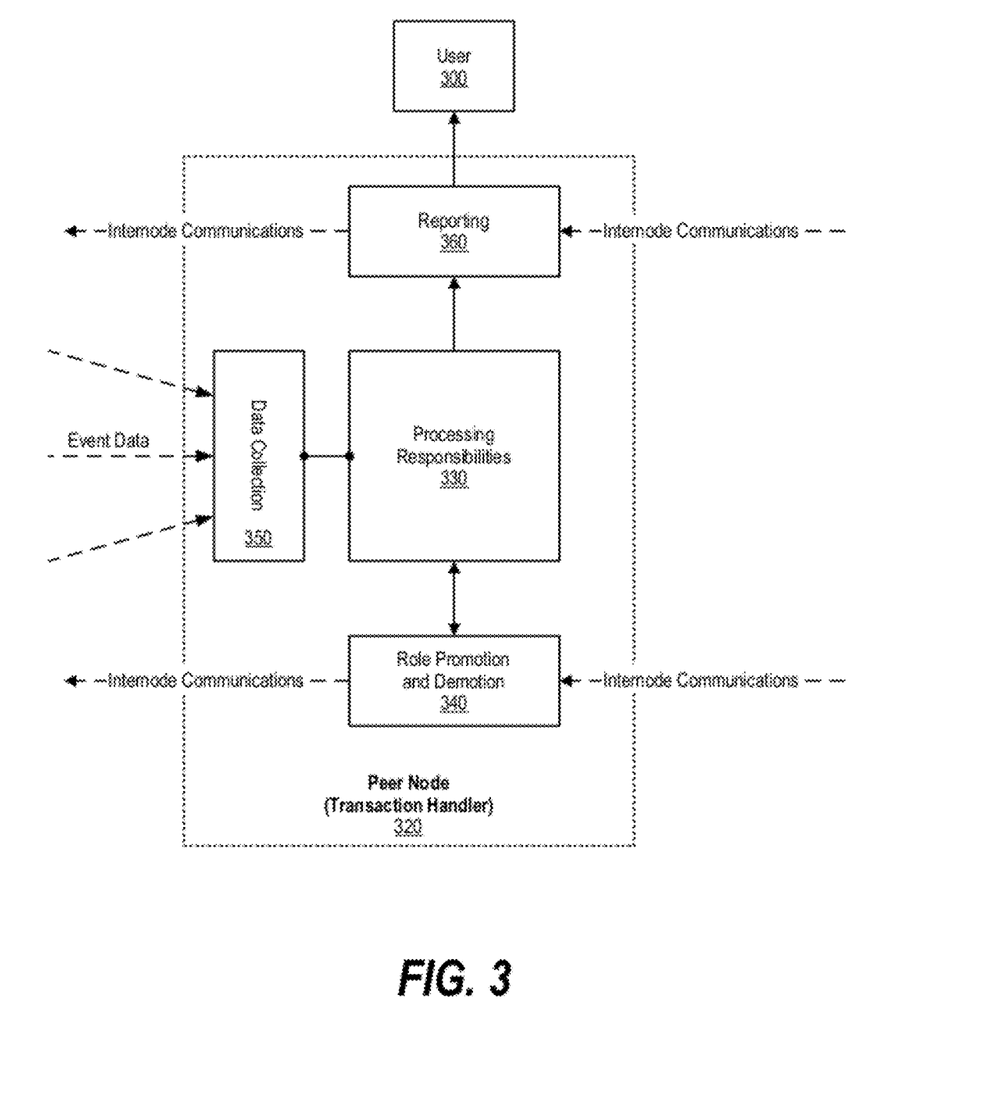
FIG. 3 is a block diagram of general processing performed by a peer node.

FIG. 3 is a block diagram of general processing performed by a peer node. Peer node 320 is responsible for handling transactions and other responsibilities. These responsibilities include reporting responsibilities 360 to communicate with user 300, role promotion and demotion responsibilities 340 that promote and demote the peer node to higher and lower levels of responsibility, and data collection responsibilities 350 that collect event data from monitored software applications or hardware devices. Processing responsibilities 330 within peer node 320 perform the various types of responsibilities—namely the reporting 360, role promotion/demotion 340, and data collection 350 responsibilities.

Referring to reporting responsibilities 360, peer node 320 is one of possibly many peer nodes that work together in a peer-to-peer monitoring framework. Internode communications between the various peer nodes is used to gather data maintained at this peer node and other peer nodes so that the data can be merged and provided to user 300 by one of the peer nodes. Likewise, role promotion and demotion responsibility 340 uses internode communication between the various nodes to identify peer nodes that perform certain framework responsibilities and communicate or update these assigned responsibilities to other peer nodes. In this manner, a flexible framework is provided that automatically promotes and demotes peer nodes based on the higher level framework responsibilities that are needed.

Figure 4:
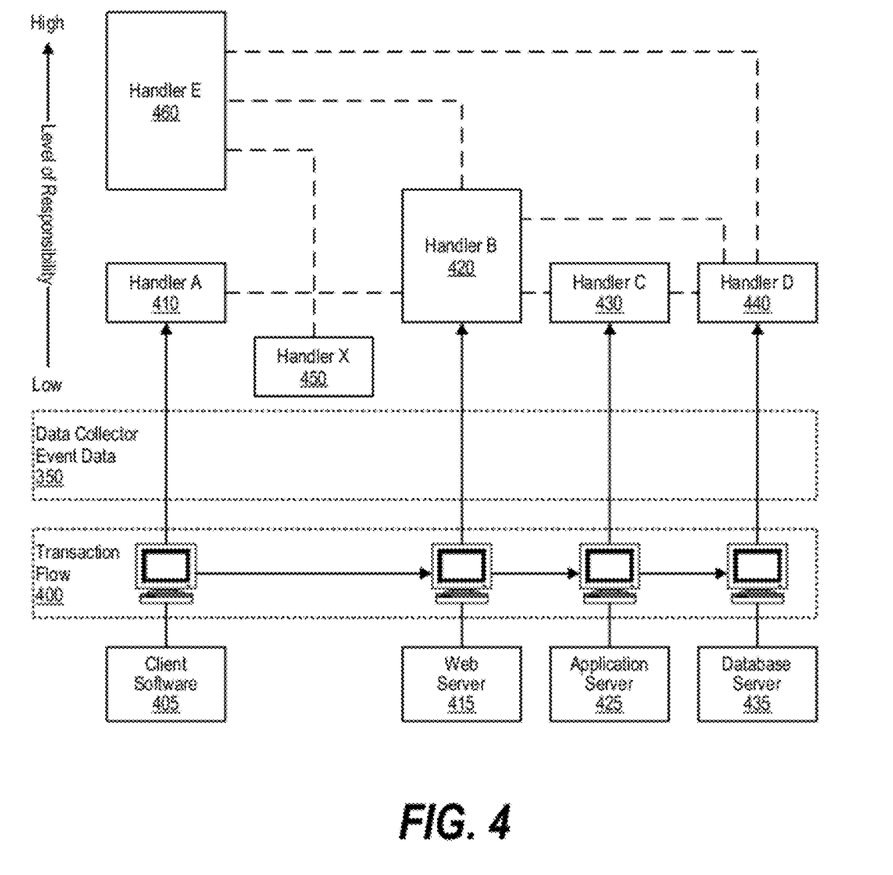
FIG. 4 is a block diagram of set of peer nodes arranged based on their levels of responsibilities as well as responsibilities of the peer nodes.

FIG. 4 is a block diagram of a set of peer nodes arranged based on their levels of responsibilities as well as responsibilities of the peer nodes. In this diagram, levels of handler responsibility are shown at the top with some handlers involving a thin layer of responsibility while others involve a thicker layer of responsibility. In addition, some handlers have lower levels of responsibility, while others have higher levels of responsibility. In the example shown, Handlers A, C, and D (410, 430, and 440) each have the same spectrum of responsibilities with each being responsible as a data collector of event data for a single software application in the framework. Handler A (410) is the data collector for client software 405, Handler C (430) is the data collector for application server 425, and Handler D (440) is the data collector for database server 435. Handler X (450) is at a lower level of responsibility as it currently is not assigned any responsibilities. However, if another software application comes on-line, then, if needed, Handler X (450) could be "promoted" to handle data collection for such software application.

Handler B (420) has data collection responsibilities for web server 415. In addition, this handler also has communication channels established with handlers A, C, and D. Likewise, Handler E (460) has different communication channels. While Handler E is not responsible for data collection for any particular software application, it has communication channels established with a number of handlers (Handlers B, D, and X) and might be used to collect and aggregate data gathered by other handlers or to facilitate gathering of data used to provide reports to users of the framework.

Transaction flow layer 400 shows the real transaction flow of transactions in the end-to-end application that is being monitored. Data collector event data layer 350 shows the data collector events currently taking place in the framework (lines flowing through the data collector layer represent event data that is being monitored and tracked by the framework).

Figure 5:
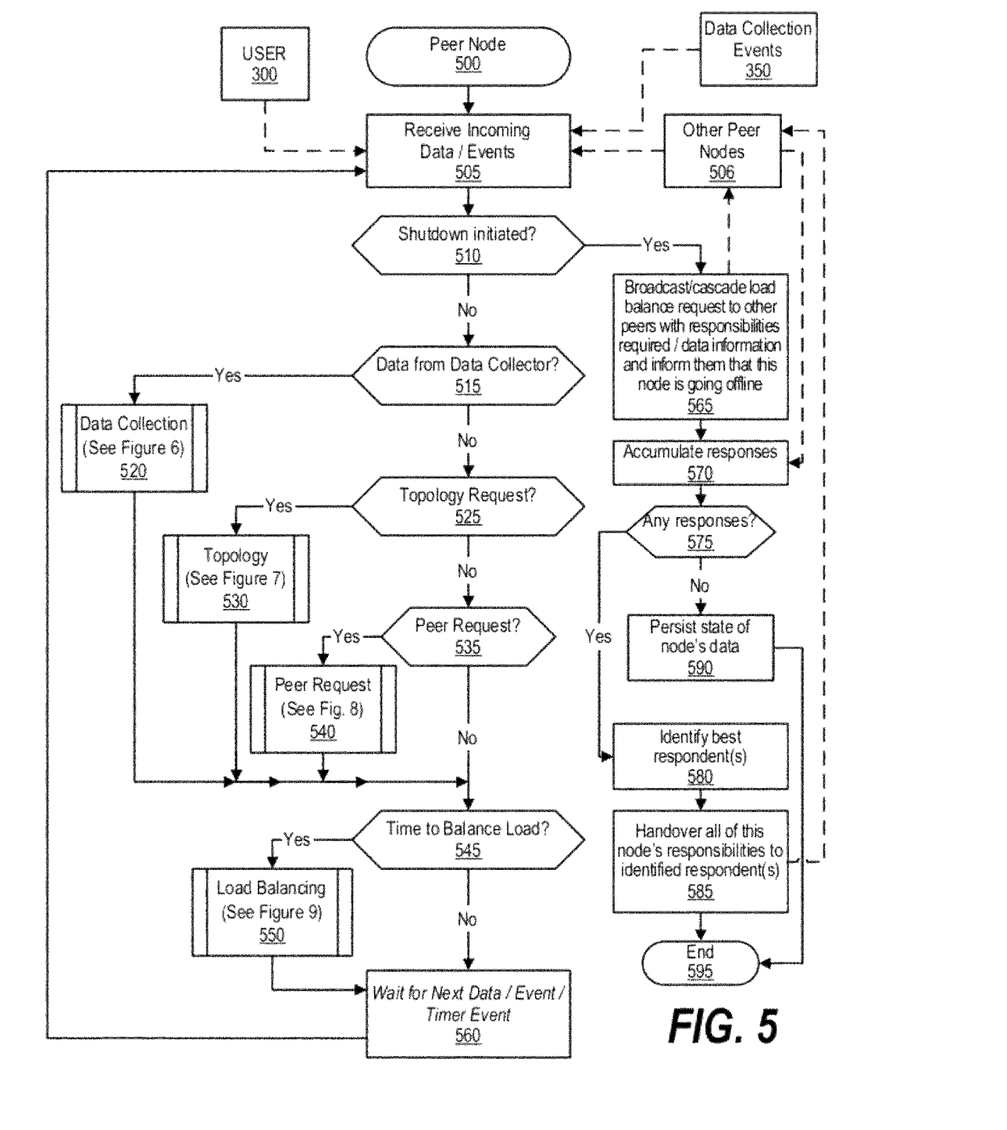
FIG. 5 is a flowchart showing high level steps taken by a peer node.

FIG. 5 is a flowchart showing high level steps taken by a peer node. Peer node processing commences at 500 whereupon, at step 505, the peer node receives incoming events and/or data. As shown, these data and events can be received from user 300, other peer nodes 506, and data collection events 350. In addition, periodically a timer event occurs when this peer node is set to perform load balancing, as will be explained in reference to predefined process 550 below.

A determination is made as to whether a shutdown process of this peer node has been initiated (decision 510). If this peer node is not being shut down, then decision 510 branches to the "no" branch whereupon a determination is made as to whether data has been received from a data collector (decision 515). If data has been received from a data collector, then decision 515 branches to the "yes" branch whereupon, at predefined process 520, data collection processing is performed (see FIG. 6 and corresponding text for processing details).

On the other hand, if data has not been received from a data collector, then decision 515 branches to the "no" branch whereupon a determination is made as to whether a topology request has been received (decision 525). If a topology request has been received, then decision 525 branches to the "yes" branch whereupon, at predefined process 530, topology processing is performed (see FIG. 7 and corresponding text for processing details).

If a topology request has not been received, then decision 525 branches to the "no" branch whereupon a determination is made as to whether a peer request has been received from one of the other peer nodes (decision 535). If a peer request has been received, then decision 535 branches to the "yes" branch whereupon, at predefined process 540, the peer request is processed (see FIG. 8 and corresponding text for processing details). On the other hand, if a peer request has not been received, then decision 535 branches to the "no" branch bypassing predefined process 540.

Periodically, a load balancing routine is performed to determine if this node is performing at a non-optimal level. In one embodiment, the load balancing routine is performed at a time interval (e.g., every minute, once every ten minutes, etc.). A determination is made as to whether it is time to balance this peer node's load (decision 545). If it is time to balance the load, then decision 545 branches to the "yes" branch whereupon, at step 550, the load balancing routine is performed (see FIG. 9 and corresponding text for processing details). On the other hand, if it is not time to balance this peer node's load, then decision 545 branches to the "no" branch bypassing predefined process 550.

At step 560, the process waits for the next data or event to arrive. In addition, a timer is set per the load balancing time interval. When the next data or event (including a time interval event) arrives, processing loops back to step 505 to receive the data or event and process it as described above. At some point a shutdown of the peer node may be initiated, at which point decision 510 branches to the "yes" branch to perform node shutdown processing.

At step 565, the peer node that has initiated a shutdown sends shutdown requests to other peer nodes 506. In one embodiment, these shutdown requests include this peer node's responsibilities and inform the other peer nodes that this peer node is going offline. At step 570, responses are accumulated from the other peer nodes 506. A determination is made as to whether any responses were received from the other peer nodes (decision 575). If one or more responses were received, then decision 575 branches to the "yes" branch whereupon, at step 580, the peer node that is shutting down identifies the best peer node respondents based on factors such as the responding peer nodes' capacity and potential synergy between this peer node's responsibilities and the responding peer nodes' responsibilities. At step 585, the peer node sends a message to one or more identified peer nodes that hands over this peer nodes' responsibilities to the identified peer nodes. This node's processing thereafter ends at 595.

Returning to decision 575, if no peer nodes responded to this peer node's message that was sent in step 565, then decision 575 branches to the "no" branch whereupon, at step 590, the node persists the state of this node's data (e.g., stores collected data to a nonvolatile storage media, etc.). After the state of the node's data is persisted, the node's processing ends at 595.

Figure 6:
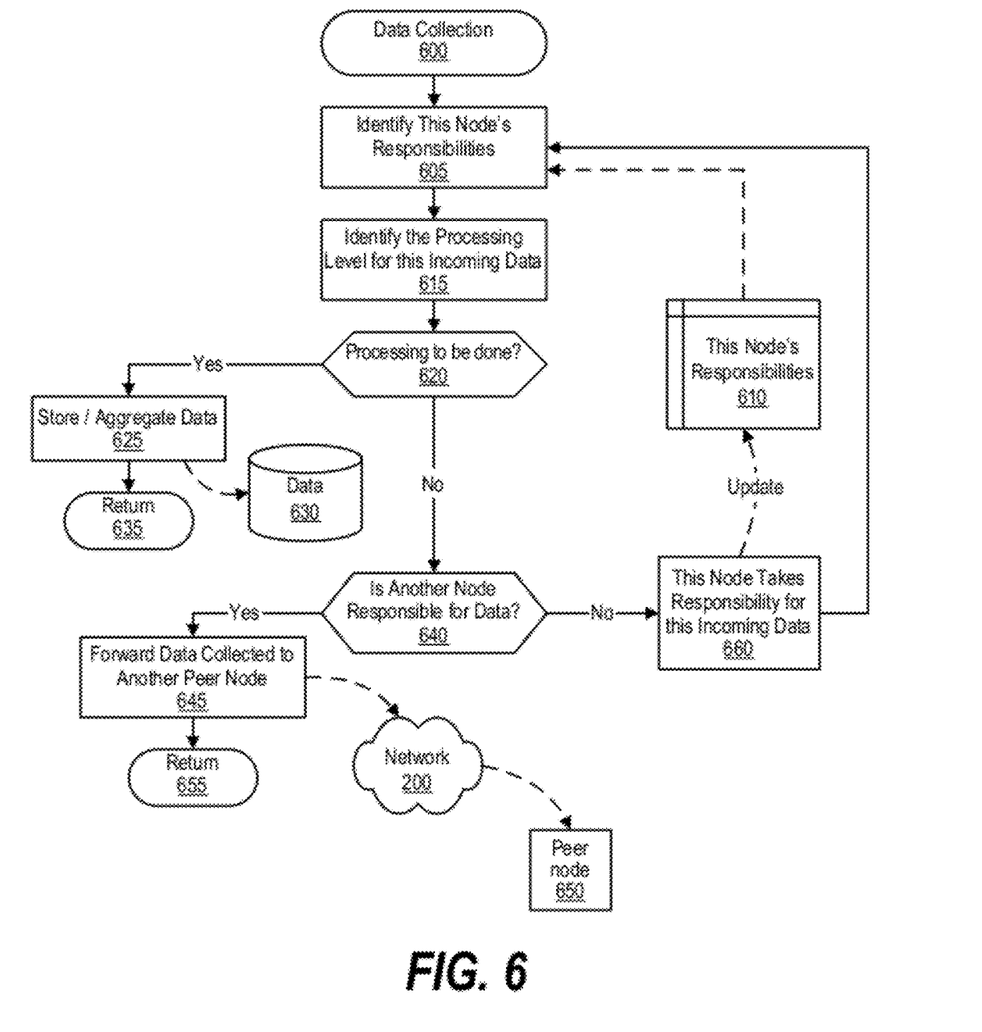
FIG. 6 is a flowchart showing data collection steps taken by a peer node.

FIG. 6 is a flowchart showing data collection steps taken by a peer node. Processing commences at 600 whereupon, at step 605, the peer node identifies its responsibilities by reading the responsibilities from memory area 610. At step 615, the peer node identifies the processing level for the incoming data (e.g., store, aggregate, ignore, etc.). A determination is made based on the identified processing level as to whether there is any processing that needs to be performed by this peer node (decision 620). If there is processing to be performed by this peer node, then decision 620 branches to the "yes" branch whereupon, at step 625 the processing is performed with the data being stored or aggregated. The processed data is written to data store 630 and processing thereafter returns to the calling routine at 635.

Returning to decision 620, if there is no processing that is to be performed by this peer node, then decision 620 branches to the "no" branch whereupon a determination is made as to whether another peer node is responsible for the incoming data (decision 640). If another peer node is responsible for the data, then decision 640 branches to the "yes" branch whereupon, at step 645, the incoming data is forwarded to another peer node 650 via computer network 200 and processing thereafter returns to the calling routine at 655

Returning now to decision 640, if no other peer node is currently responsible for handling the incoming data, then decision 640 branches to the "no" branch whereupon, at step 660, this peer node takes responsibility for handling this incoming data and this peer node's responsibilities are updated in memory area 610. Processing then loops back to step 605 to process the incoming data.

Figure 7:
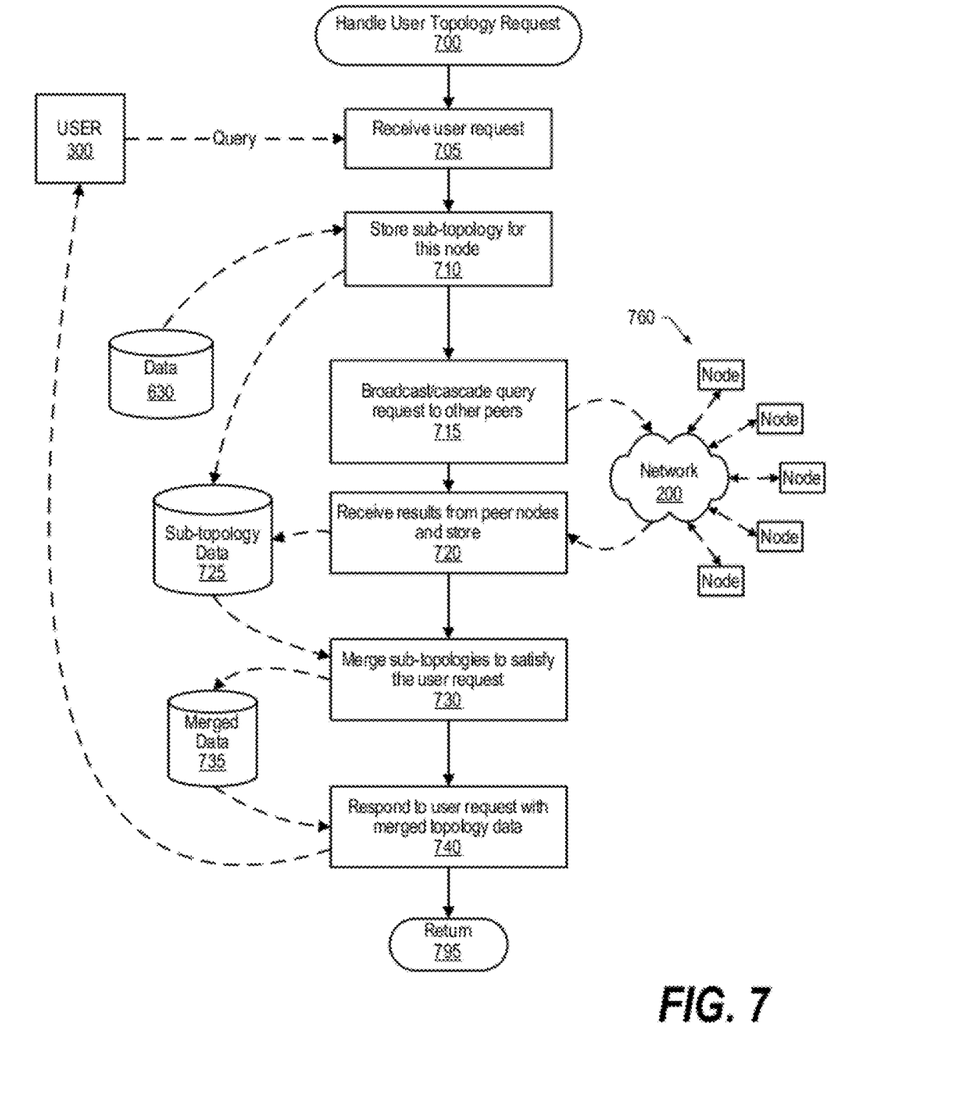
FIG. 7 is a flowchart showing peer node handling of a topology request.

FIG. 7 is a flowchart showing peer node handling of a topology request. Processing commences at 700 whereupon, at step 705, a request (e.g., a topology query, etc.) is received from user 300. At step 710, the peer node checks data being maintained by this peer node by reading data from data store 630 and applies the user's query to the data receiving a query response that is stored in sub-topology data store 725. At step 715, the peer node sends (using a broadcast, cascade or other method) a message that includes the query request to other peer nodes 760 using computer network 200. The other peer nodes run the query against data maintained at their respective systems and return the query results to the peer node that sent the request. At step 720, the peer node receives the query results from the other peer nodes and stores the received results in sub-topology data store 725. At step 730, the various sub-topologies stored in data store 725 are merged in order to satisfy the user's request. The merged data are stored in merged data store 735. At step 740, the peer node responds to the user request with the merged topology data as stored in data store 735. In one embodiment, the merged data, or a link to the merged data, is returned to user 300. Processing thereafter returns to the calling routine at 795.

Figure 8:
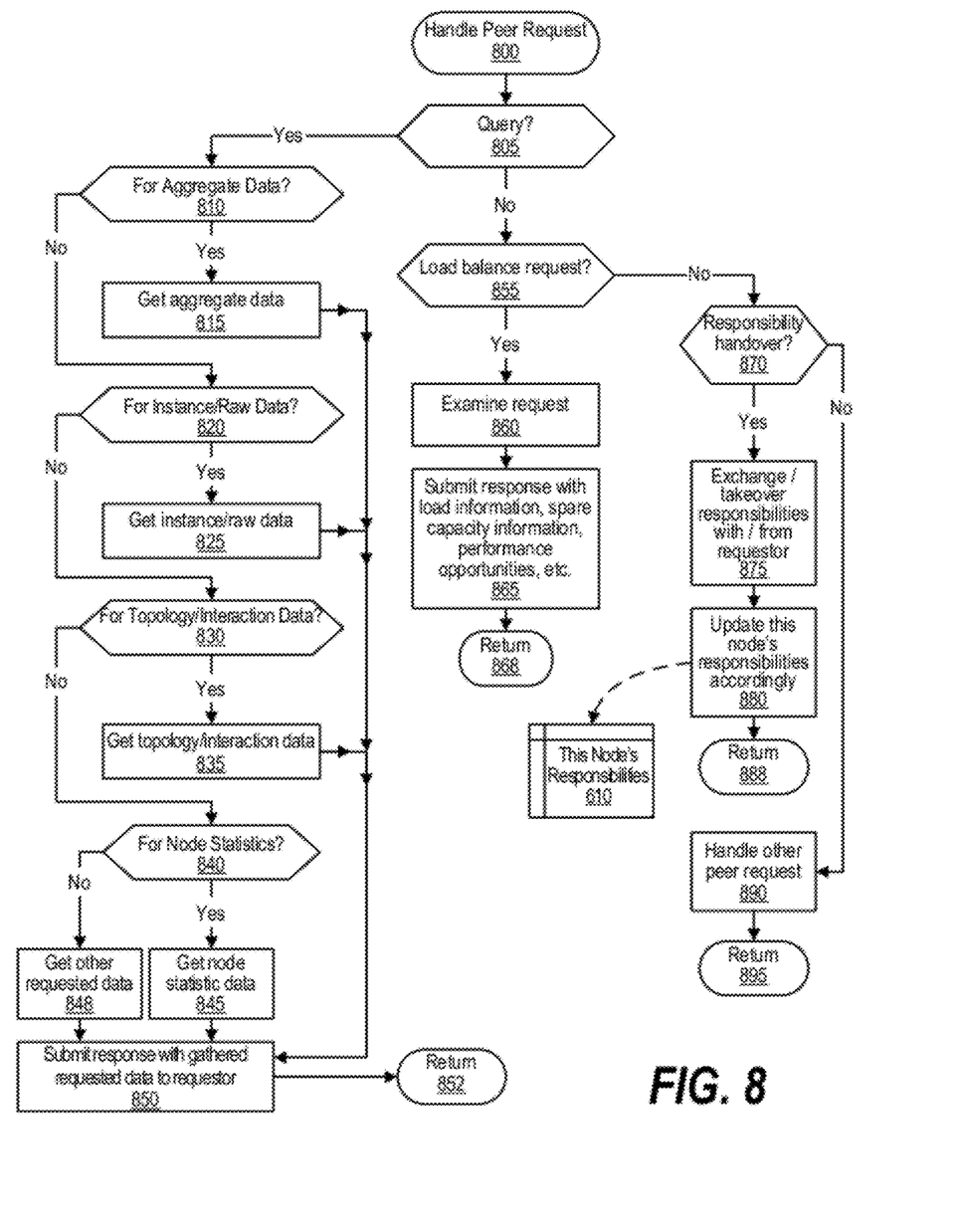
FIG. 8 is a flowchart showing steps taken by a peer node to handle a request received from another peer node.

FIG. 8 is a flowchart showing steps taken by a peer node to handle a request received from another peer node. Processing commences at 800 whereupon a determination is made as to whether the request received from another peer node is a query request (decision 805).

If the request is a query request, then decision 805 branches to the "yes" branch whereupon a determination is made as to whether the query request is for aggregate data (decision 810). If the query request is for aggregate data, then decision 810 branches to the "yes" branch whereupon, at step 815, the requested aggregate data is gathered. On the other hand, if the request is not for aggregate data, then decision 810 branches to the "no" branch whereupon a determination is made as to whether the request is for instance/raw data (decision 820). If the query request is for instance/raw data, then decision 820 branches to the "yes" branch whereupon, at step 825, the requested instance/raw data is gathered. On the other hand, if the query request is not for instance/raw data, then decision 820 branches to the "no" branch whereupon a determination is made as to whether the request is for topology/interaction data (decision 830). If the request is for topology/interaction data, then decision 830 branches to the "yes" branch whereupon, at step 835, the requested topology/interaction data is gathered. On the other hand, if the request is not for topology/ interaction data, then decision 830 branches to the "no" branch whereupon a determination is made as to whether the request is for node statistics (decision 840). If the request is for node statistics, then decision 840 branches to the "yes" branch whereupon the requested node statistic data is gathered at step 845. On the other hand, if the request is not for node statistics, then decision 840 branches to the "no" branch whereupon, at step 848, some other requested data is gathered. After the requested data is gathered at one of the aforementioned steps, at step 850 the peer node sends a response back to the requesting peer node with the gathered response data. Processing thereafter returns to the calling routine at 852.

Returning to decision 805, if the request is not a query request, then decision 805 branches to the "no" branch whereupon a determination is made as to whether the request is a load balance request (decision 855). If the peer request is a load balance request then decision 855 branches to the "yes" branch whereupon, at step 860, the peer node analyzes the request and, at step 865, the peer node submits a response to the requesting peer node. The response may include the node's load information, spare capacity information, performance data, and the like. Processing then returns to the calling routine at 868.

Returning to decision 855, if the request received from another peer node is not a query or a load balance request, then decision 855 branches to the "no" branch whereupon a determination is made as to whether the request is a responsibility handover where the requesting peer node is handing over one or more of its responsibilities to this peer node. If the request is a responsibility handover, then decision 870 branches to the "yes" branch whereupon, at step 875, this node receives a list of one or more responsibilities from the other peer node. If a responsibility exchange is taking place, the requesting node may also inform this node as to which of this node's responsibilities are being taken by the requesting node. At step 880, this peer node's responsibilities are updated reflecting the one or more responsibilities being transferred from the other peer node to this peer node as well as any responsibilities being transferred from this peer node to the other peer node. These changes are stored in node responsibility memory area 610. Processing then returns to the calling routine at 888. Finally, returning to decision 870, if the request is not a responsibility handover, then decision 870 branches to the "no" branch whereupon, at step 890 the other type of request is handled and processing returns to the calling routine at 895.

Figure 9:
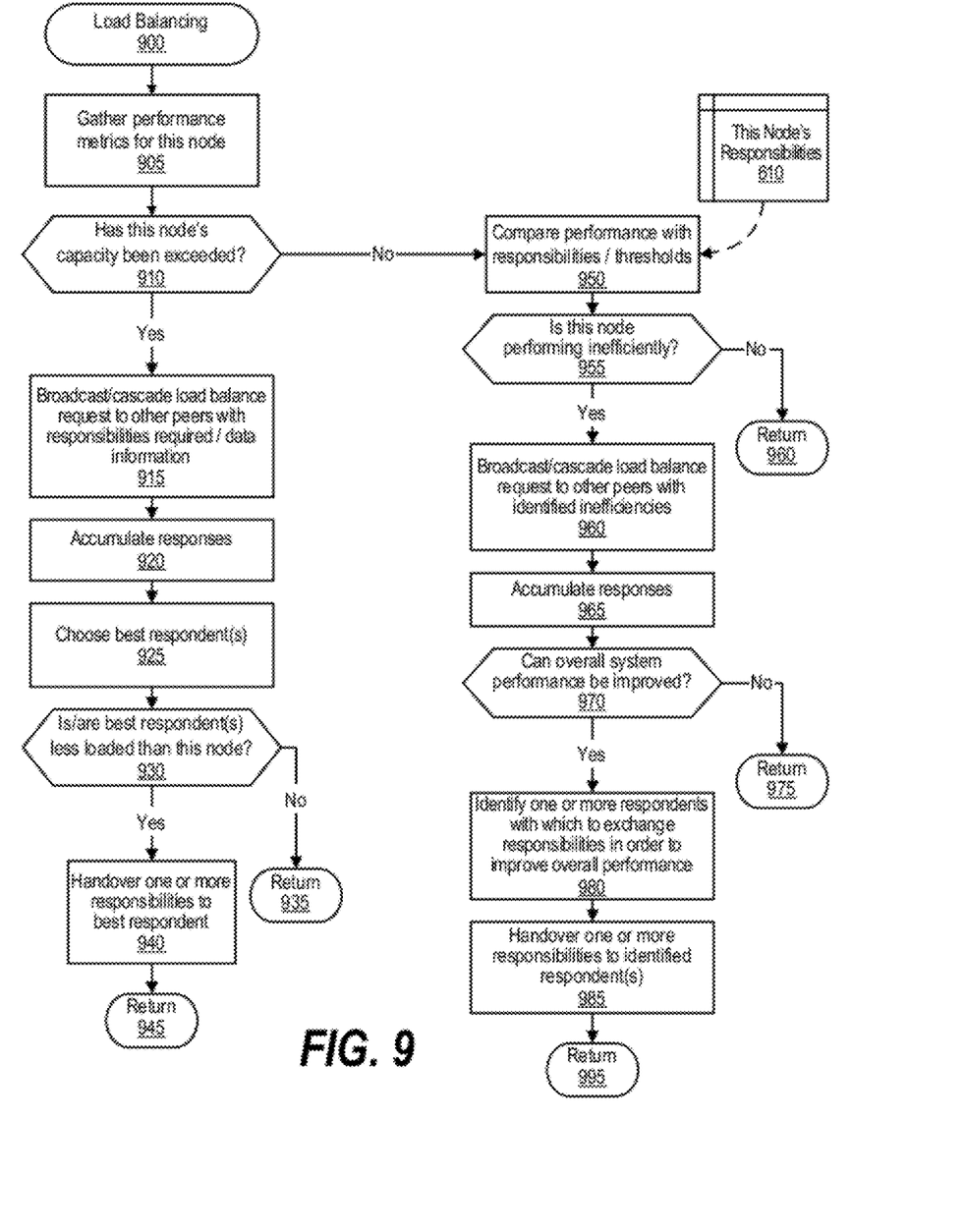
FIG. 9 is a flowchart showing steps taken to balance the load among the peer nodes.

FIG. 9 is a flowchart showing steps taken to balance the load among the peer nodes. Processing commences at 900 whereupon, at step 905, the peer node gathers system performance metrics. A determination is made as to whether this peer node's capacity has been exceeded (decision 910). If the peer node's responsibilities have been exceeded, then decision 910 branches to the "yes" branch whereupon, at step 915, a message is sent (e.g., using a broadcast, cascade, or other method) to other peer nodes with a request for the other peer nodes' responsibilities and load information. At step 920, the peer node accumulates the responses received from the other peer nodes. At step 925 one or more of the respondents are chosen based upon the received responses. A determination is made as to whether the chosen respondent(s) is, or are, less loaded than this peer node (decision 930). If the chosen respondent(s) are not less loaded then it does not make sense to offload this node's responsibilities to the respondent(s), so decision 930 branches to the "no" branch and processing returns to the calling routine at 935 without handing over any of this node's responsibilities to any of the responding nodes. On the other hand, if one or more of the responding nodes are less loaded than this node then decision 930 branches to the "yes" branch whereupon, at step 940, one or more of this node's responsibilities are handed over to the chosen responding node(s). In one embodiment, the handing over process uses a message sent from this node to the responding nodes informing the responding nodes of the responsibilities being handed over. Load balancing processing then returns to the calling routine at 945.

Returning to decision 910, if this node's capacity has not been exceeded, then decision 910 branches to the "no" branch whereupon, at step 950, this node's performance is compared with its current responsibilities stored in memory area 610 and performance thresholds corresponding to these responsibilities. A determination is made as to whether the node is performing its current responsibilities inefficiently (decision 955). The peer node is deemed to be working at a non-optimal level if either decision 910 or decision 955 is "true" (branches to "yes"). If the node is performing within parameters (not inefficiently), then decision 955 branches to the "no" branch whereupon processing returns to the calling routine at 960. On the other hand, if this peer node is performing inefficiently, then decision 955 branches to the "no" branch whereupon, at step 960, a message is sent (e.g., using a broadcast, cascade, or other method) to other peer nodes with a request for the other peer nodes' responsibilities and load information. At step 965, the peer node accumulates the responses received from the other peer nodes. A determination is made as to whether overall system (network monitoring framework) performance can be improved by handing off one or more of this node's responsibilities to one or more of the responding peer nodes (decision 970). If overall system performance cannot be improved, then the peer node maintains its current responsibilities and decision 970 branches to the "no" branch whereupon processing returns to the calling routine at 975 without handing over any of this node's responsibilities to any of the responding peer nodes. On the other hand, if overall system improvement can be improved, then decision 970 branches to the "yes" branch whereupon, at step 980, one or more of the responding nodes are identified with which this node will hand over or exchange responsibilities in order to improve overall system performance and, at step 985 one or more of this node's responsibilities are handed over to the chosen responding node(s). In one embodiment, the handing over process uses a message sent from this node to the responding nodes informing the responding nodes of the responsibilities being handed over and, in the case of an exchange, also includes the other node's responsibilities that will be handled by this peer node. Load balancing processing then returns to the calling routine at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   gathering one or more performance metrics for a first peer node, wherein the first peer node is one of a plurality of peer nodes included in a transaction tracking framework, and wherein one or more of the plurality of peer nodes, including the first peer node, have one or more assigned transaction tracking responsibilities, the assigned transaction tracking responsibilities corresponding to monitoring one or more software applications;
   determining, based on the gathered performance metrics for the first peer node, that the first peer node is performing at a non-optimal level;
   in response to the determining, transmitting a load balance request from the first peer node to one or more of the plurality of peer nodes;
   receiving, at the first peer node, one or more responses from the one or more of the plurality of peer nodes;
   determining, based on the received responses, whether to handover a selected one or more of the transaction tracking responsibilities assigned to the first peer node;
   identifying a second peer node selected from the one or more of the plurality of peer nodes, the identifying performed in response to the determination being to handover the selected one or more transaction tracking responsibilities assigned to the first peer node;
   sending a handover message from the first peer node to the second peer node, wherein the handover message assigns at least one of the first peer node's assigned transaction tracking responsibilities from the first peer node to the second peer node;
   receiving, at the first peer node, data collected by a first monitored software application;
   identifying a peer node with responsibility to collect data corresponding to the first monitored software application;
   storing a form of the received data at the first peer node in response to identifying that the first peer node has the responsibility to collect the data corresponding to the first monitored software application; and
   forwarding the received data to the second peer node in response to identifying that the second peer node has the responsibility to collect the data corresponding to the first monitored software application.

2. The method of claim 1 further comprising:
identifying, by the first peer node, a handler responsibility needed by the plurality of peer nodes; and
assigning the identified handler responsibility to the first peer node.

3. The method of claim 1 further comprising:
initiating a shutdown of the first peer node;
transmitting a shutdown request from the first peer node to at least one of the plurality of peer nodes;
determining whether any of the at least one of the plurality of peer nodes responded to the shutdown request with a response; and
in response to determining that one or more of the at least one of the plurality of peer nodes responded to the shutdown request:
  identifying one or more of the responding peer nodes to handle the transaction tracking responsibilities assigned to the first peer node based on the responses received from the responding peer nodes;
  sending a second request to the identified responding peer nodes that hands over the transaction tracking responsibilities assigned to the first peer node from the first peer node to the identified responding peer nodes; and
  shutting down the first peer node.

4. The method of claim 3 further comprising:
in response to determining that none of the at least one of the plurality of peer nodes responded to the shutdown request:
  saving a state of the first peer node on a nonvolatile storage media; and
  shutting down the first peer node.

5. The method of claim 1 further comprising:
in response to identifying that none of the peer nodes has responsibility to collect the data corresponding to the first monitored software application:
  assigning the responsibility to collect the data corresponding to the first monitored software application to the first peer node; and
  storing the form of the received data at the first peer node.

6. The method of claim 1 further comprising:
receiving a user topology request at the first peer node;
retrieving topology data corresponding to the first peer node based on the user topology request;
transmitting a topology request from the first peer node to the plurality of peer nodes, wherein the topology request includes a query corresponding to the user topology request;
receiving, at the first peer node, topology results from at least one of the plurality of peer nodes; and
merging the retrieved topology data and the received topology results into a topology data response.

7. The method of claim 1 further comprising:
receiving, at the first peer node, a peer request from a selected one of the plurality of peer nodes, wherein the peer request includes a responsibility handover; and
assigning the first peer node with one or more responsibilities from the selected peer node, wherein the first peer node thereafter handles the assigned one or more responsibilities.

8. The method of claim 1 further comprising:
in response to the determination being to inhibit handover of any of the selected transaction tracking responsibilities:
  maintaining the transaction tracking responsibilities assigned to the first peer node at the first peer node.

9. A machine-implemented method comprising:
gathering one or more performance metrics for a first peer node, wherein the first peer node is one of a plurality of peer nodes included in a transaction tracking framework, and wherein one or more of the plurality of peer nodes, including the first peer node, have one or more assigned transaction tracking responsibilities, the assigned transaction tracking responsibilities corresponding to monitoring one or more devices;
determining, based on the gathered performance metrics for the first peer node, that the first peer node is performing at a non-optimal level;
in response to the determining, transmitting a load balance request from the first peer node to one or more of the plurality of peer nodes;
receiving, at the first peer node, one or more responses from the one or more of the plurality of peer nodes;
determining, based on the received responses, whether to handover a selected one or more of the transaction tracking responsibilities assigned to the first peer node;
identifying a second peer node selected from the one or more of the plurality of peer nodes, the identifying performed in response to the determination being to handover the selected one or more transaction tracking responsibilities assigned to the first peer node;
sending a handover message from the first peer node to the second peer node, wherein the handover message assigns at least one of the first peer node's assigned transaction tracking responsibilities from the first peer node to the second peer node;
receiving, at the first peer node, data collected regarding a first monitored device;
identifying a peer node with responsibility to collect data corresponding to the first monitored software application;
storing a form of the received data at the first peer node in response to identifying that the first peer node has the responsibility to collect the data corresponding to the first monitored device; and
forwarding the received data to the second peer node in response to identifying that the second peer node has the responsibility to collect the data corresponding to the first monitored device.

10. The method of claim 9 further comprising:
identifying, by the first peer node, a handler responsibility needed by the plurality of peer nodes; and
assigning the identified handler responsibility to the first peer node.

11. The method of claim 9 further comprising:
initiating a shutdown of the first peer node;
transmitting a shutdown request from the first peer node to at least one of the plurality of peer nodes;
determining whether any of the at least one of the plurality of peer nodes responded to the shutdown request with a response; and
in response to determining that one or more of the at least one of the plurality of peer nodes responded to the shutdown request:
  identifying one or more of the responding peer nodes to handle the transaction tracking responsibilities assigned to the first peer node based on the responses received from the responding peer nodes;
  sending a second request to the identified responding peer nodes that hands over the transaction tracking responsibilities assigned to the first peer node from the first peer node to the identified responding peer nodes; and shutting down the first peer node.

12. The method of claim 11 further comprising:

in response to determining that none of the at least one of the plurality of peer nodes responded to the shutdown request:

saving a state of the first peer node on a nonvolatile storage media; and shutting down the first peer node.

13. The method of claim 9 further comprising:

in response to identifying that none of the peer nodes has responsibility to collect the data corresponding to the first monitored device:

assigning the responsibility to collect the data corresponding to the first monitored device to the first peer node; and storing the form of the received data at the first peer node.

14. The method of claim 9 further comprising:

receiving a user topology request at the first peer node;

retrieving topology data corresponding to the first peer node based on the user topology request;

transmitting a topology request from the first peer node to the plurality of peer nodes, wherein the topology request includes a query corresponding to the user topology request;

receiving, at the first peer node, topology results from at least one of the plurality of peer nodes; and merging the retrieved topology data and the received topology results into a topology data response.

15. The method of claim 9 further comprising:

receiving, at the first peer node, a peer request from a selected one of the plurality of peer nodes, wherein the peer request includes a responsibility handover; and assigning the first peer node with one or more responsibilities from the selected peer node, wherein the first peer node thereafter handles the assigned one or more responsibilities.

16. The method of claim 9 further comprising:

in response to the determination being to inhibit handover of any of the selected transaction tracking responsibilities:

maintaining the transaction tracking responsibilities assigned to the first peer node at the first peer node.

\* \* \* \* \*